United States Patent [19]

Ishida et al.

[11] Patent Number: 5,079,652
[45] Date of Patent: Jan. 7, 1992

[54] DEVICE FOR CONTROLLABLY LESSENING LOAD FORCES ON DISK MEDIA IN AERODYNAMICALLY FLYING HEAD DATA STORAGE FILE

[75] Inventors: Hiroyuki Ishida, Yamato; Takashi Saito, Ayase; Yasuhiro Ueki, Sagamihara, all of Japan

[73] Assignee: Victor Company of Japan, Ltd., Yokohama, Japan

[21] Appl. No.: 497,712

[22] Filed: Mar. 23, 1990

[30] Foreign Application Priority Data

Mar. 24, 1989 [JP] Japan .............................. 1-33631[U]
Sep. 28, 1989 [JP] Japan ............................ 1-112816[U]

[51] Int. Cl.$^5$ .............................................. G11B 5/54
[52] U.S. Cl. ...................................... 360/75; 360/103; 360/105
[58] Field of Search ............. 360/75, 71, 97.01, 98.01, 360/98.02, 69, 103–106, 109

[56] References Cited

U.S. PATENT DOCUMENTS

| 4,535,374 | 8/1985 | Anderson et al. | 360/103 |
| 4,787,000 | 11/1988 | Schulze | 360/105 |
| 4,829,396 | 5/1989 | Okutsu | 360/105 |
| 4,843,502 | 6/1989 | Tagawa | 360/105 |

FOREIGN PATENT DOCUMENTS

60-25877 12/1985 Japan .
62-277672 12/1987 Japan .

Primary Examiner—Aristotelis Psitos
Assistant Examiner—Steven R. Garland
Attorney, Agent, or Firm—Fleit, Jacobson, Cohn, Price, Holman & Stern

[57] ABSTRACT

A pair of data transducers are gimbaled on the distal ends of resilient carrier beams for writing and reading data on the opposite major surfaces of a hard data storage disk. The carrier beams bias the transducers into contact with predefined landing zones on the disk surfaces when the disk is at rest. Sliding over the disk surfaces when the disk is set into rotation, the transducers start flying on an air cushion generated by disk rotation as the disk picks up speed. In order to reduce the load forces exerted by the transducers on the disk during the starting period of the disk drive motor, a pair of transducer lift arms are disposed between the disk and the respective transducer carrier beams. Being of bimorph cell construction, the transducer lift arms bend away from the disk surfaces in response to an applied voltage, thereby lifting the transducer carrier beams to an extent necessary to lessen the load forces.

7 Claims, 5 Drawing Sheets

DEVICE FOR CONTROLLABLY LESSENING LOAD FORCES ON DISK MEDIA IN AERODYNAMICALLY FLYING HEAD DATA STORAGE FILE

BACKGROUND OF THE INVENTION

This invention relates generally to apparatus having a data transducer (head) or transducers for reading and/or writing data on disk-like record media typically including magnetic disks. More particularly, this invention pertains to a rotating disk data storage apparatus built on what is known in the art as Winchester technology, such that the transducers "fly" or are airborne at a small spacing from the data storage surfaces of a hard disk during the transfer of data therewith. Still more particularly, the invention deals with a mechanism incorporated in such an apparatus for lessening load forces exerted by the transducers on the disk as the transducers slide over the disk surfaces during the starting or ending period of disk rotation.

In flying transducer data storage systems, as is well known, a hard disk or disks are employed which have a magnetic data storage medium coated or otherwise formed on the major surfaces thereof. A series of concentric data storage tracks are formed on each disk surface. Disk diameters in consideration here are two and a half inches or three and a half inches, although various other diameter disks are used in practice.

For reading or writing data on the storage surface of the disk, data transducers are gimbaled on the distal ends of resilient transducer carrier beams which may be cantilevered directly to a voice coil motor or may be coupled to any equivalent transducer positioning means. The voice coil motor operates to move the transducers across the data tracks and to position them on any desired tracks.

Normally, that is, when the disk is out of rotation, the transducers are held in contact with predefined landing zones on the disk surfaces, which zones may be either radially inside or outside the data storage tracks, under the bias of the transducer carrier beams and the gimbal springs. The transducers slide over the disk surfaces when the disk is set into rotation. Then, as the disk picks up speed, the transducers ride upon an air cushion created by disk rotation and start flying over the disk surfaces for reading or writing data thereon.

The construction and operation of the data storage apparatus described hereinbefore is based upon the contact start stop scheme. This scheme, as so far practiced in the art, has given rise to several inconveniences. One of these is the rapid, uneven wear of the disk as the transducers slide over the landing zone at the start and end of each run of disk rotation. The particles produced by disk abrasion have also adversely affected the various working parts of apparatus.

Another inconvenience is the large starting current requirement of the disk drive motor, due of course to the great starting torque imposed by the transducers sliding over the disk surfaces under the forces of both transducer carrier beams and gimbal springs. This large starting current requirement has presented a particularly serious problem when the apparatus is battery operated, because of the shorter useful life of the battery.

Additionally, with the repeated start and stop of disk rotation, the transducers have been easy to grind the disk surfaces to such smoothness as to result in a substantial increase in frictional resistance. The starting current requirement of the disk drive motor has further increased with the increase in frictional resistance. This same reason has also given rise to the danger of the transducers sticking to the disk surfaces so fast as to be ruined by the forced starting of disk rotation.

An obvious remedy to the listed difficulties arising from the contact start stop method might be to hold the transducers out of contact with the disk surfaces against the spring forces during the starting and ending periods of disk rotation. Various suggestions have actually been made for this noncontact start stop method. Although the known noncontact methods are free from the difficulties of the contact start stop scheme, they have their own drawbacks.

According to one such known noncontact method, the transducers are held spaced approximately one to two millimeters from the disk surfaces during the starting period. Then, as the disk picks up speed to the normal value, the transducers must be allowed to fly upon an air cushion created by disk rotation, with the standard spacing of 0.4 micrometers. Great difficulties have been involved in controlling this transition of the transducer spacings. Furthermore, as this noncontact starting of the disk is repeated in use of the disk drive, the danger has arisen of the transducers being destroyed by coming into contact with the disk.

SUMMARY OF THE INVENTION

The present invention solves the problems of how to start disk rotation in the rotating disk data storage apparatus of the type under consideration so as to minimize disk wear, to reduce the starting current requirement of the disk drive motor, and to preclude the possibility of transducer destruction.

In summary the present invention concerns a rotating disk data storage apparatus which, stated in its simplest form, includes a data storage disk rotatingly driven by a disk drive motor, a data transducer for writing and reading data on a major surface of the disk, and transducer carriage means for moving the transducer across a multiplicity of concentric data tracks on the major surface of the disk. The transducer carriage means include a transducer carrier beam of resilient material carrying the transducer on one end thereof, in such a manner that the transducer is held in contact with a predefined landing zone on the major surface of the disk under the bias of the transducer carrier beam when the disk is out of rotation. When the disk is in rotation, on the other hand, the transducer flies in close proximity to the major surface of the disk by virtue of an air bearing created by disk rotation. Therefore, the transducer inevitably slides over the disk surface from the moment the disk is set into rotation to the moment the disk speed grows sufficiently high for the transducer to start flying over the disk.

The present invention is directed more specifically to a transducer lifter mechanism for the rotating disk data storage apparatus of the type defined above. The transducer lifter mechanism includes a transducer lift arm of piezoelectric material disposed between the data storage disk and the transducer carrier beam and normally held out of contact with both of them. An electric driver circuit is connected to the transducer lift arm for applying a prescribed voltage thereto and hence to produce a mechanical distortion thereof, such that the lift arm lifts the carrier beam away from the disk against its own bias, to such an extent as to lessen the load force exerted by the transducer on the disk.

Preferably, the transducer lift arm takes the form of bimorph cell construction comprising two strips of piezoelectric material bonded together. The arm bends in proportion to an applied voltage, so that the load force exerted by the transducer on the disk is easily and accurately reduced to a desired degree through control of the applied voltage.

With the transducer load force lessened as above in accordance with the invention, the wear of the disk and the starting current requirement of the disk drive motor are both made much less than those according to the prior art contact start method. Moreover, unlike the prior art noncontact method, no difficulty is encountered in the transition of the reduced contact pressure start to the aerodynamic flight of the transducer in accordance with the invention. The present invention is also distinguished over the prior art noncontact method in the absence of the danger of the transducer being ruined by accidentally hitting the disk no matter how many times the disk is set into and out of rotation.

The present invention also teaches how to mount the transducer lifter mechanism in position on the data storage apparatus. The transducer lifter mechanism can be preassembled and readily mounted in position, with the transducer lift arm disposed in the exact positional relationship to the disk and the transducer carrier beam and without the risk of damaging the lift arm or the disk or any other part of the apparatus.

Advantageously, the transducer lifter mechanism according to the present invention makes possible the use of a compact, low cost motor for driving the disk, by improving its starting characteristic.

In another preferred embodiment of the invention disclosed herein, the transducer lift arm is supported for minimum torsional displacement in response to external forces or vibrations. The lift arm is effectively prevented from accidentally hitting and ruining the disk, but the support means do not interfere in any way with the proper functioning of the lift arm.

The above and other features and advantages of this invention and the manner of realizing them will become more apparent, and the invention itself will best be understood, from a study of the following description and appended claims, with reference had to the attached drawings showing the preferred embodiments of the invention.

DESCRIPTION OF THE PREFERRED EMBODIMENTS

General

The present invention will now be described in detail in terms of a rotating magnetic disk data storage apparatus 10 illustrated in FIG. 1. The apparatus 10 has but one hard magnetic disk 12, although two or more such disks could be employed within the broad teaching hereof. Also, in this particular embodiment, the magnetic disk 12 is double sided, with a magnetic data storage medium coated or deposited on its opposite major surfaces. The disk diameter may be two and a half inches or three and a half inches. The magnetic disk 12 is mounted fast to a drive spindle 14 which is herein shown as the armature shaft of a disk drive motor 16, so that the disk is rotated directly by this motor at a normal speed of 3600 revolutions per minute.

A transducer carriage assembly 18 includes a transducer positioning motor such as a voice coil motor 20. A pair of transducer carrier beams 22 of resilient sheet metal material are proximally cantilevered to brackets 24 forming parts of the voice coil motor 20. A pair of magnetic data transducers 26, one seen in FIG. 1, are mounted to the distal ends of the transducer carrier beams 22 via gimbal springs 28. Spot welding is the usual method of mounting the gimbal springs 28 to the transducer carrier beams 22. The gimbal springs 28 are made of sheet metal that is thinner and more pliant than the sheet metal of which the transducer carrier beams 22 are formed.

Gimbaled as above on the distal ends of the transducer carrier beams 22, the pair of transducers 26 are disposed opposite the data storage surfaces of the hard magnetic disk 12 and in register with each other. The voice coil motor 20 operates to cause bidirectional angular displacement of the transducer carrier beams 22 about a pivot 30 extending parallel to the disk drive spindle 14. With such angular displacement of the carrier beams 22, the transducers 26 travel across the series of concentric data tracks on the opposite surfaces of the disk 12 and are positioned over any desired tracks.

As is well known in the hard disk drive art, the transducers 26 are positioned on predetermined landing zones on the disk surfaces when the disk 12 is at rest. The carrier beams 22 and gimbal springs 28 conjointly urge the transducers 26 against the disk 12 with approximately 10 grams of force. During the normal speed rotation of the disk 12, on the other hand, the transducers 26 ride on an air cushion generated by disk rotation and thus are held spaced approximately 0.3 millimeter from the disk surfaces as they read or write data on the data storage tracks.

The construction and operation of the data storage apparatus 10 as so far described are conventional, and therein lies no feature of the present invention. The novel features of the invention reside in a transducer lifter mechanism incorporated in the apparatus 10 and in its relationship with the other parts of the apparatus.

Transducer Lifter Mechanism

Figure 1:
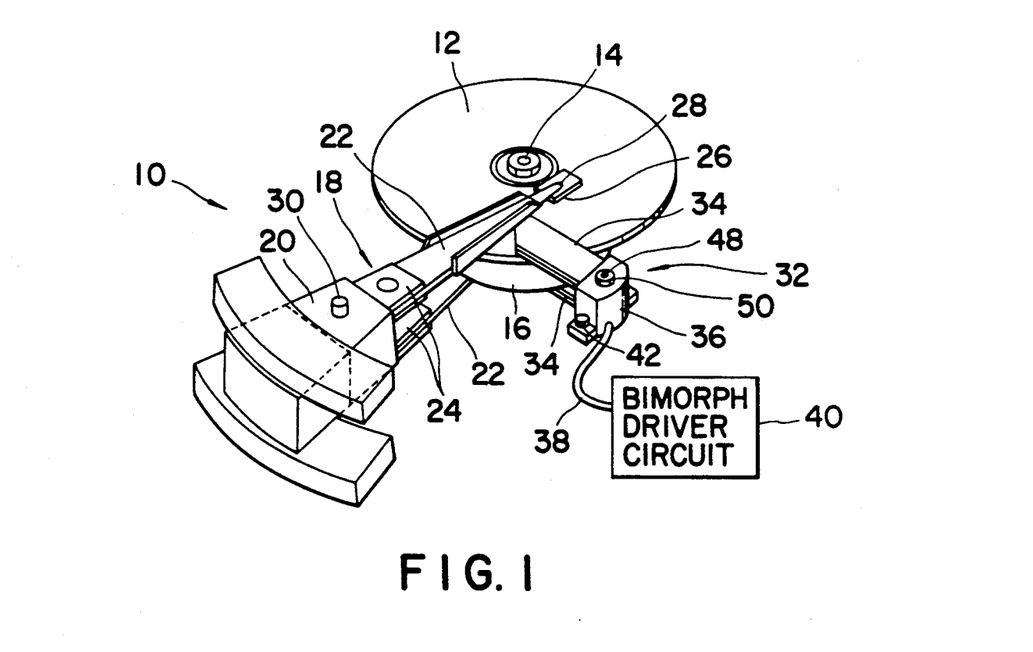
FIG. 1 is a perspective view of the rotating magnetic disk data storage apparatus incorporating the transducer lifter mechanism in accordance with the present invention.
Figure 2:
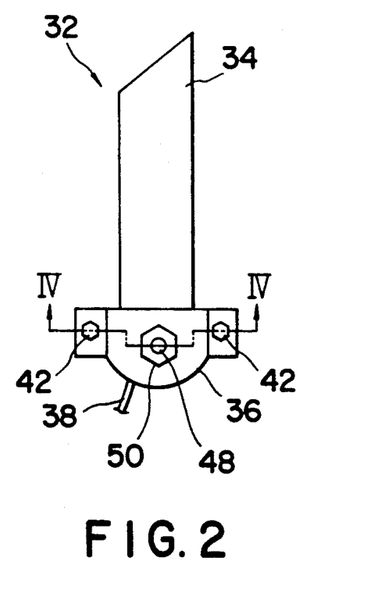
FIG. 2 is an enlarged plan view of the transducer lifter mechanism of FIG. 1.
Figure 3:
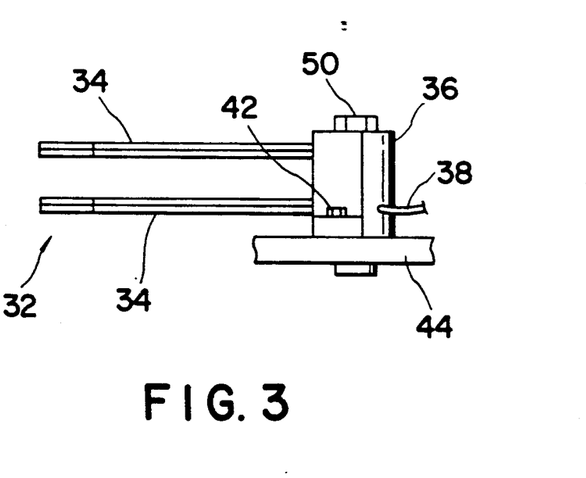
FIG. 3 is a side elevation of the transducer lifter mechanism of FIG. 1.
Figure 4:
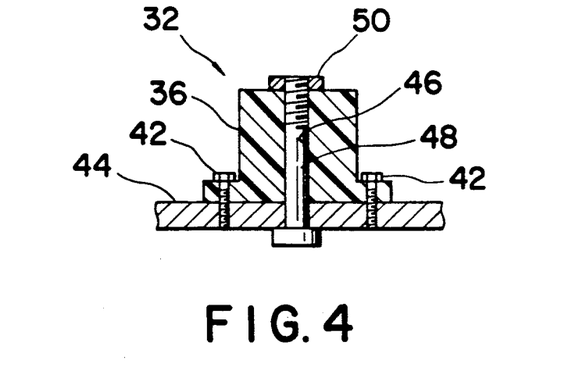
FIG. 4 is a section through the transducer lifter mechanism, taken along the line IV—IV in FIG. 2.

The transducer lifter mechanism is seen at 32 in FIG. 1 and illustrated on an enlarged scale in FIGS. 2-4. It includes a pair of transducer lift arms 34 cantilevered to a suitable fixed support structure shown as a molded plastic post 36 erected adjacent to the periphery of the magnetic disk 12. The transducer lift arms 34 extend from the post 36 toward the transducer carrier beams 22 in right angular relationship therewith and has its distal end portions disposed between the disk 12 and the transducer carrier beams. Normally, the transducer lift arms 34 are spaced approximately 0.5 millimeter from the disk 12 and approximately 0.3 millimeter from the transducer carrier beams 22.

The transducer lift arms 34 are shown to take the form of the familiar bimorph cell construction, each comprising two strips of piezoelectric material cemented together into a total thickness of, typically, 0.4 millimeter. The lift arms are electrically connected via cable 38 to a bimorph driver circuit shown in block form at 40 in FIG. 1. The application of a voltage from this bimorph driver circuit 40 to the transducer lift arms 34 cause one piezoelectric strip of each arm to expand and the other to contract. Thus bending away from the disk surfaces, the transducer lift arms 34 lift the transducer carrier beams 22 to such an extent as to lessen the load forces exerted by the transducers 26 on the disk 12.

FIG. 2 best indicates that the transducer lift arms 34 have their free end portions tapered. This tapering of the transducer lift arms 34 is intended for their point contact with the transducer carrier beams 22 when the lift arms are energized, in order that the carrier beams may be raised exactly in proportion to the voltage applied to the lift arms.

The post 36 supporting the transducer lift arms 34 is secured by fastener elements such as screws 42 to a flat frame member 44, FIGS. 3 and 4, laid parallel to the plane of the magnetic disk 12. This post is well designed for the ease of mounting of the preassembled transducer lifter mechanism 32 in position on the apparatus 10, with the lift arms 34 in the exact positional relationship to the disk 12 and transducer carrier beams 22. The post 36 has a clearance hole 46 extending therethrough in a direction perpendicular to the plane of the disk 12. Received in the clearance hole 46 is, in this particular embodiment, a bolt 48 complete with a nut 50.

With the preassembled transducer lifter mechanism 32 placed on the frame member 44, the bolt 48 may be inserted in the clearance hole 46 in the post 36 from under the frame member 44. The transducer lift arms 34 may be held oriented more or less away from the magnetic disk 12 at this time. Then the nut 50 may be turned down on the bolt 48 to an extent necessary to hold the post in place on the frame member. Then the vertical positions of the transducer lift arms 34 may be adjusted with a suitable tool with respect to those of the disk 12 and transducer carrier beams 22. Then the transducer lift arms 34 may be manually turned about the bolt 48 in a clockwise direction, as viewed in a plan view as in FIG. 2, to the required angular position in which they extend normal to the transducer carrier beams 22. Then the nut 50 may be fully tightened on the bolt 48, and the post 36 may be additionally secured to the frame member 44 by the screws 42.

Thus has been completed the mounting of the transducer lifter mechanism 32 in place on the apparatus 10. There will be practically no possibility of the transducer lift arms 34 hitting the disk 12 or transducer carrier beams 22 during the process of such mounting.

As will be understood from the foregoing, the bolt 48 serves as a pivot about which the post 36 is turned for mounting the transducer lifter mechanism 32 in the required angular position relative to the disk 12 and transducer carrier beams 22. The bolt may therefore be replaced by a pivot pin erected on the frame member 44 because the post 36 can be secured to the frame member solely by the screws 42. The bolt was employed in this embodiment as it serves both as pivot and as fastener element.

Operation of Transducer Lifter Mechanism

Figure 5A:
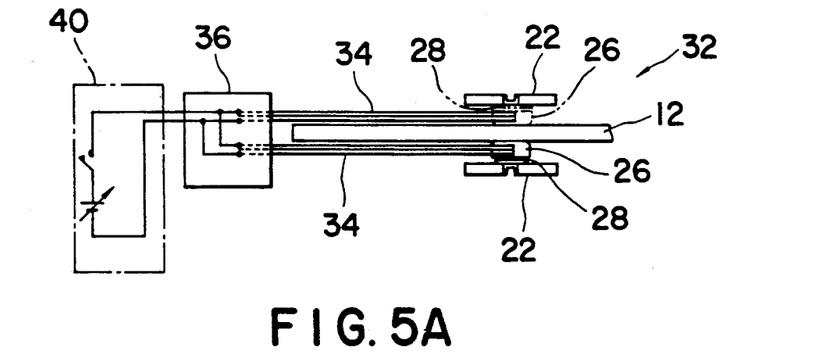
FIGS. 5A and 5B are schematic diagrams explanatory of the operation of the transducer lifter mechanism.
Figure 5B:
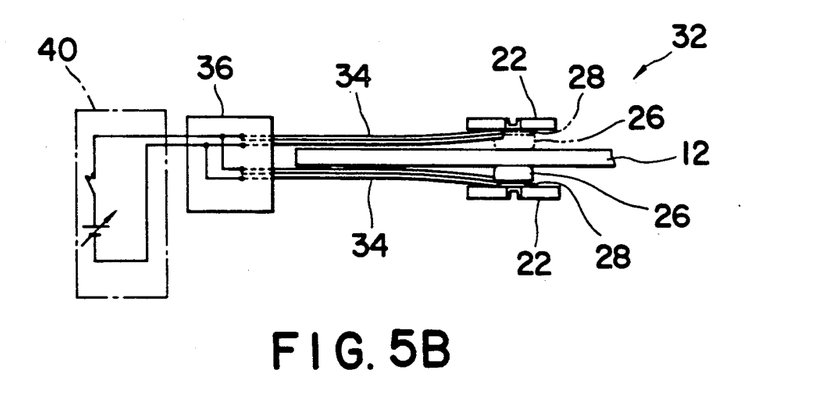

The operation of the transducer lifter mechanism 32 will become apparent from a study of FIGS. 5A and 5B. FIG. 5A represents the normal state of the transducer lifter mechanism 32, with the transducer lift arms 34 unenergized and extending in parallel spaced relation to each other. The data transfer apparatus 10 may be considered to be either in or out of operation. The transducer lift arms 34 are so thin (e.g. 0.3 millimeter) in consideration of the usual spacings between disk 12 and transducer carrier beams 22, that they will not interfere in any way with the desired operation of the transducer carriage assembly 18 or with the rotation of the disk 12.

FIG. 5B shows the transducer lift arms 34 bent away from the disk surfaces by application of a direct voltage of, say, 90 to 100 volts. The lift arms 34 are to be so energized during the starting period of the disk drive motor 16, when the transducers 26 are sliding over the landing zones on the disk 12. The bending of the lift arms 34 results in a decrease in the load forces exerted by the transducers 26 on the disk 12 to one to three grams of force. Of course, the load forces can be decreased, or even totally eliminated, through control of the voltage applied to the lift arms 34.

The energization of the lift arms 34 may be discontinued approximately when the disk 12 picks up speed to such an extent that the transducers 26 start flying over the disk surfaces. The lift arms 34 will return to the normal state of FIG. 5A by the time the disk 12 attains the normal operating speed. A smooth transition will thus be accomplished from the low contact pressure start to the aerodynamic flight of the transducers over the disk surfaces, with no harm whatsoever done by the lift arms 34 either to the disk 12 or to the transducer carrier beams 22.

Let us suppose a data storage apparatus wherein the disk drive motor demands a starting current of 750 milliamperes if contact started under 10 grams of force, and that of 300 milliamperes if noncontact started. The starting current requirement of this same disk drive motor will be approximately 400 milliamperes if the motor is started under the reduced load forces in accordance with the invention. The wear of the disk can also be reduced to a negligible degree. The slightly higher starting current requirement according to the invention than that according to the conventional noncontact method is more than offset by the absence of the noted difficulties of the noncontact scheme.

During the ending period of disk rotation, too, the transducer lifter mechanism 32 may be activated to bring the disk drive motor 16 to rest under reduced load forces. However, the transducer lifter mechanism may be held unactuated during that period if it is to be used for the reduction of starting current rather than for the reduction of disk wear.

As has been mentioned, the load forces exerted by the transducers on the disk are controllable by varying the voltage impressed to the transducer lift arms 34. It is therefore envisaged within the scope of this invention to monitor the current being drawn by the disk drive motor 16 during each starting period and to control the voltage applied to the transducer lift arms so as to keep the current at a constant value.

Automatic Control of Transducer Lifter Mechanism

The transducer lifter mechanism according to this invention is of particular utility when the disk drive motor takes the form of a sensorless, brushless motor. One reason for this is the reduced variations in starting load torque on the motor through reduction of disk wear. Another is the capability of controlling the load forces on the motor by the voltage applied to the transducer lift arms. By the "sensorless" motor is meant the one that dispenses with Hall effect elements or like sensors for the detection of the angular position of the rotor.

Figure 6:
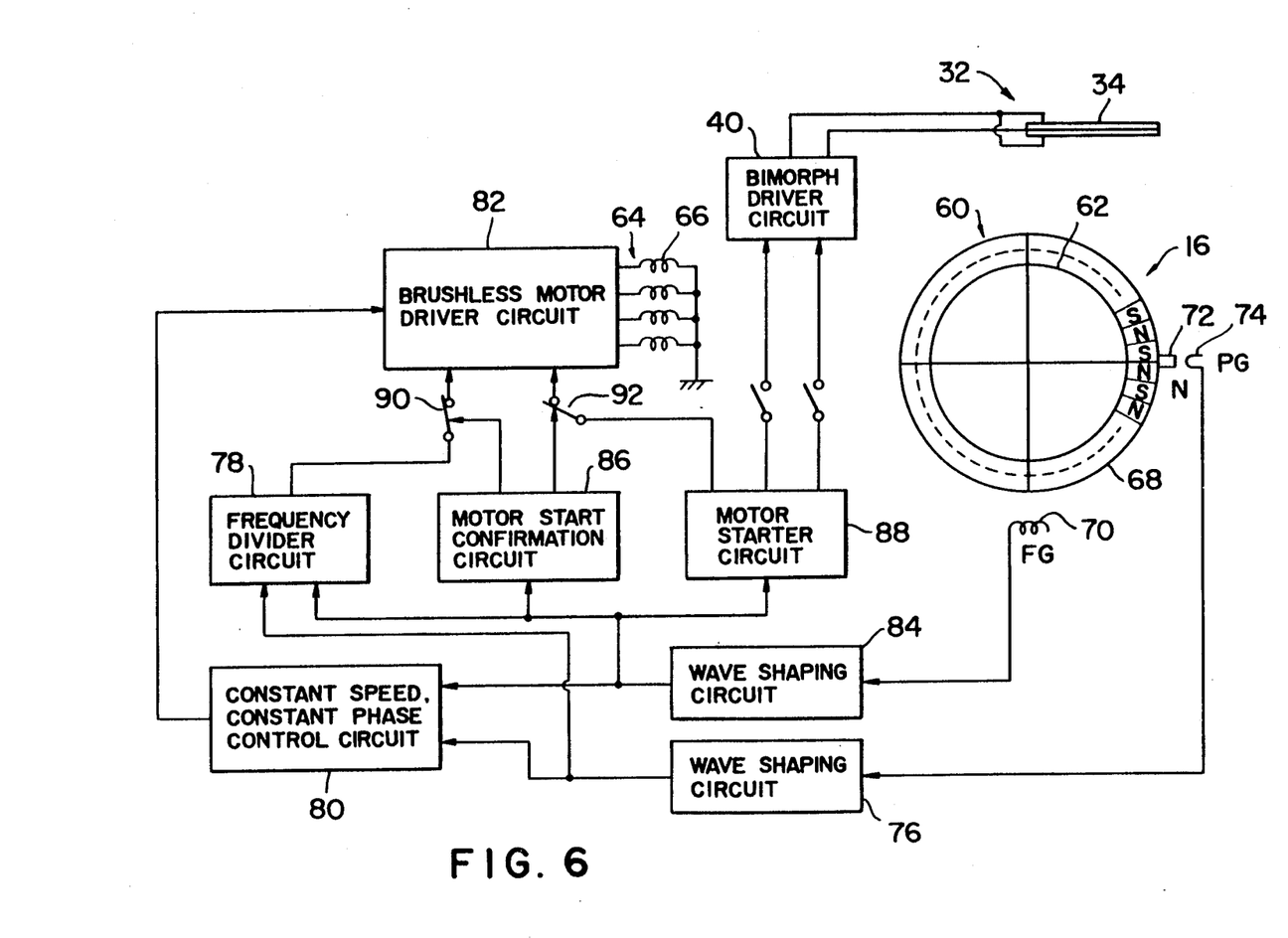
FIG. 6 is a block diagram of the control system for the disk drive motor in the data storage apparatus of FIG. 1, showing together with an electric driver circuit for the transducer lifter mechanism under the control of the motor control system.

FIG. 6 is a block diagrammatic representation of an automatic control system for a sensorless, brushless motor employed as the disk drive motor in the data storage apparatus 10 of FIG. 1. The bimorph driver circuit 40 is also shown connected to this control system for automatically controlling the transducer lifter mechanism 32 in association with the operation of the sensorless motor.

Although the sensorless, brushless motor 16 is shown highly diagrammatically, it will nevertheless been seen that is comprises a rotor 60 having a disklike drive magnet 62 with four alternating N and S poles, and a stator 64 having four phase drive coils 66 disposed opposite the drive magnet. The motor 16 is additionally provided with frequency generator means FG for generating a motor speed signal and with pulse generator means PG for generating a motor position signal (index signal). The frequency generator means FG comprises an annular magnet 68 for having thirty two poles and mounted around the drive magnet 62 for joint rotation therewith, and a magnetoelectric converter 70 disposed opposite the annular magnet 68. The pulse generator means PG comprises a magnet 72 affixed to the periphery of the rotor 60, and another magnetoelectric converter 74 disposed adjacent the path of the magnet 72.

The pulse generator means PG generates a pulse each time the magnet 72 travels past the magnetoelectric converter 74 with the rotation of the rotor 60. These pulses constituting the motor position signal, are fed to a wave shaping circuit 76 thereby to be modified into pulses of more well defined shape. The output pulses of the wave shaping circuit 76 are directed to both frequency divider circuit 78 and constant speed, constant phase control circuit 80. This latter circuit 80 is connected directly to a brushless motor driver circuit 82 which controllably energizes the drive coils 66 of the motor 16.

The frequency generator means FG, on the other hand, generates the motor speed signal of sinusoidal waveform at a rate of 16 cycles per rotor revolution. The frequency of this motor speed signal varies in proportion to the motor speed. The motor speed signal is fed to another wave shaping circuit 84 in which the signal is modified from sinusoidal into rectangular waveform. The output from the wave shaping circuit 84 is delivered not only to the frequency divider circuit 78 and the constant speed, constant phase control circuit 80 but also to a motor start confirmation circuit 86 and a motor starter circuit 88. The frequency divider circuit 78 and the motor starter circuit 88 are connected to the motor driver circuit 82 via switches 90 and 92, respectively, which are to be opened and closed by the motor start confirmation circuit 86. The motor starter circuit 88 is additionally connected to the bimorph driver circuit 40 for controlling the energization of the transducer lift arms 34 in timed relation to the operation of the motor 16.

The following operation of the motor control circuit can all be controlled automatically under the direction of a factory preprogrammed computer.

The transducer lifter mechanism 32 has been in the state of FIG. 5A, with the lift arms 34 out of contact with the transducer carrier beams 22, when the motor 16 is out of rotation. The motor starter circuit 88 first responds to a motor start command from an external source by causing the bimorph driver circuit 40 to be powered on and to apply a predetermined direct voltage of 90-100 volts to the lift arms 34 shortly (e.g. 0.7 second) before the motor 16 is set into rotation. So energized, the lift arms 34 will bend as shown in FIG. 5B and lift the transducer carrier beams 22 to lessen the load forces exerted by the transducers 26 on the disk 12.

After having thus decreased the load forces, the motor starter circuit will deliver starting pulses to the motor driver circuit 82, it being understood that the motor start confirmation circuit 86 has held the switch 90 open, and the other switch 92 closed, when the motor 16 is at rest. The motor driver circuit 82 will respond to the incoming starting pulses by sequentially exciting the four phase driver coils 66 of the motor 16 to initiate its rotation.

The speed of rotation of the motor 16 is constantly monitored by the frequency generator means FG. When the motor speed builds up to 1000-1500 revolutions per minute, at which the transducers 26 start riding on an air cushion generated by disk rotation, the bimorph driver circuit 40 may be caused to apply a negative voltage of, say, −30 volt to the lift arms 34 in order to correct their hysteretic displacement and then may be powered off, allowing the lift arms to return to the normal positions of FIG. 5A.

The motor start confirmation circuit 86 will close the switch 90 and open the switch 92 approximately when the motor 16 picks up speed to the normal value of 3600 revolutions per minute. The frequency divider circuit 78, now connected to the motor driver circuit 82, will divide the frequency of the incoming motor speed signal at a predetermined ratio of ½ in this particular embodiment. Also, set by the index pulses, the frequency divider circuit 78 will put out a series of drive pulses at a rate of eight per motor revolution. The motor driver circuit 82 will respond to these drive pulses by sequentially exciting the four phase drive coils 66 of the motor 16 accordingly.

The constant speed, constant phase control circuit 80 generates constant speed and constant phase control signals in response to the motor speed and motor position signals from the wave shaping circuits 76 and 84. The motor driver circuit 82 use the output from the control circuit 80 for correspondingly controlling the excitation of the drive coils 66. The motor speed is thus controlled through negative feedback of speed and phase information.

The sensorless, brushless motor 16 has an inherent weakness in starting characteristic but has the advantages, gained through the omission of a Hall effect element or like position sensor, of compactness in size and simplicity and inexpensiveness in construction. Controlled in the above described manner, the transducer lifter mechanism according to the invention makes it possible to improve the starting characteristic of the motor and, in consequence, to derive the full benefits therefrom.

Let the starting characteristic of the sensorless, brushless motor 16 be defined as the resultant of the starting torque produced by the motor and the starting load torque imposed thereon. Should this starting characteristic vary greatly, the starting drive pulses from the motor starter circuit 88 would not match with the speed of rotation of the motor 16. The motor starter circuit might then fail to start the motor. The transducer lifter mechanism according to the invention precludes this possibility by lessening variations in the starting load torque on the motor.

The transducer lifter mechanism according to the invention offers an additional advantage in connection with the initial phasing of the four phase drive coils 66 with the four pole drive magnet 62 of the motor 16 preparatory to motor startup by the driving pulses from the motor starter circuit 88. During such initial phasing, which is accomplished by energization of one of the four phase drive coils, the rotor has been susceptible to oscillatory motion due to inertial forces from the load, demanding a longer time to come into phase with the stator coils. There has even been the possibility that the motor starter circuit fails to start up the motor by commencing the delivery of the starting drive pulses to the motor driver circuit before completion of the phasing operation.

In order to overcome these difficulties the transducer lifter mechanism may be held unenergized during the phasing operation, allowing the transducers to contact the disk surfaces under the full spring forces.

The rotor will then come into phase with the stator in a minimum of time through reduction of its oscillatory movement by the spring forces. The transducer lifter mechanism may be activated upon completion of the phasing operation, permitting the disk drive motor to be started under the reduced load forces as stated above.

Alternate Transducer Lifter Mechanism

Figure 7:
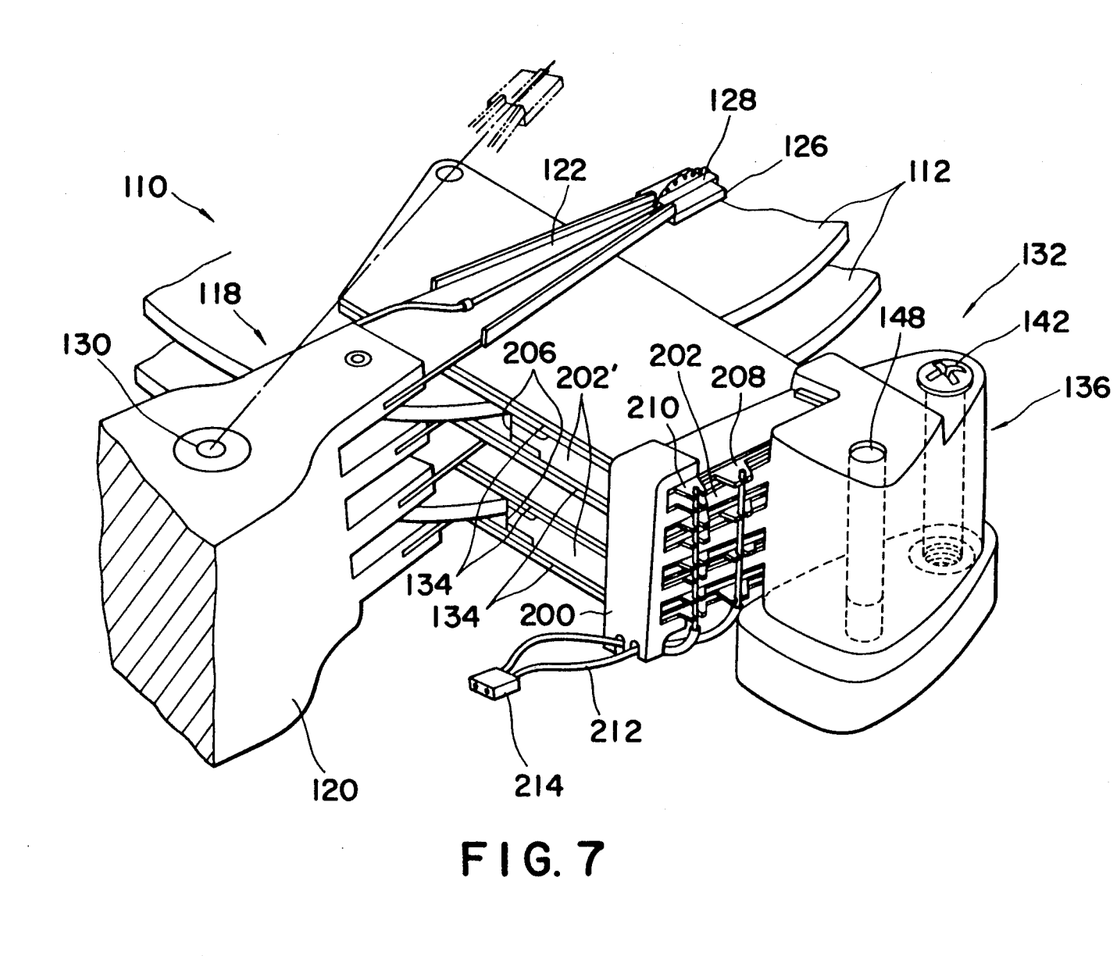
FIG. 7 is a fragmentary perspective view of another preferred form of rotating disk data storage apparatus incorporating another preferred form of transducer lifter mechanism in accordance with the present invention.

FIG. 7 shows an alternate form of transducer lifter mechanism 132 featuring an improved method of supporting the transducer lift arms so as to prevent them from ruining the magnetic disks as a result of the application of external forces or vibrations to the data storage apparatus. The alternate transducer lifter mechanism 132 is shown in an environment of a two disk data storage apparatus 110, although it could be used in a one disk apparatus such as shown in FIG. 1.

The data storage apparatus 110 has two hard magnetic disks 112 which are mounted to a common drive spindle such as shown at 12 in FIG. 1. A transducer carriage assembly 118 has four transducers 126, one seen, for data transfer with the opposite major surfaces of the two disks 112. The transducers 126 are mounted respectively to the free ends of carrier beams 122 via gimbal springs 128. These transducer carrier beams are all cantilevered to a voice coil motor 120 thereby to be swung about a pivot 130.

Figure 8:
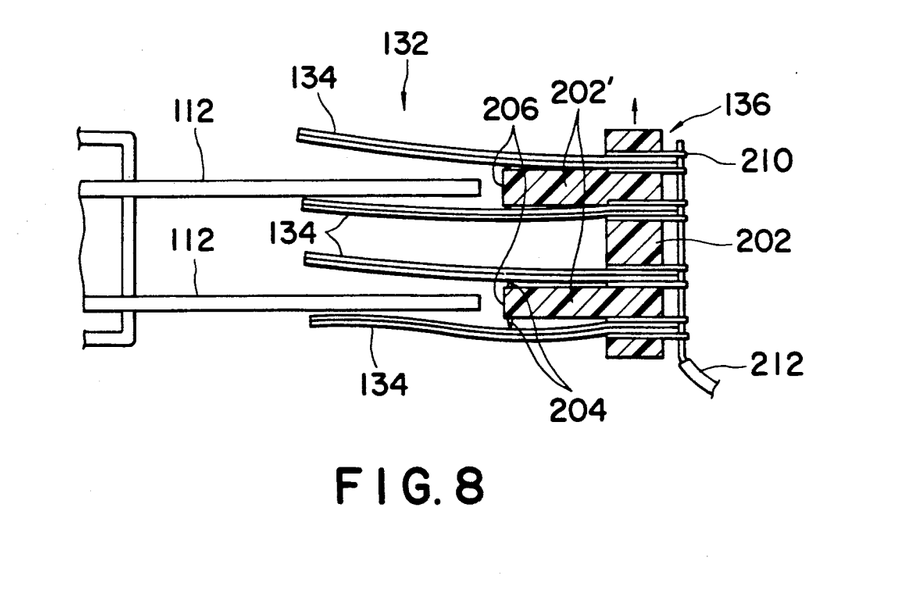
FIG. 8 is a partial vertical section through the transducer lifter mechanism of FIG. 7, the view being explanatory of its operation.

The transducer lifter mechanism 132 is shown also in FIG. 8. As will be noted from both FIGS. 7 and 8, it has four transducer lift arms 134 of bimorph cell construction having their electroded base end portions mounted to a common fixed support structure 136. Each transducer lift arm 134 has its free end portion between one disk 112 and one transducer carrier beam 122 opposed thereto.

The support structure 136 is a one piece molding of plastics, complete with a supporting wall portion 200 having beams 202 extending horizontally with vertical spacings therebetween. The transducer lift arms 134 have three to five millimeters of their electroded base end portions caught between the beams 202 and bonded thereto. The beam 202' between each pair of transducer lift arms 134 extends approximately six millimeters toward, and terminates short of, the periphery of the disk 112 lying between that pair of lift arms. Each beam 202' has a pair of fulcrums 204 formed on the opposite sides of its tip 206, each fulcrum being in abutting engagement with one transducer lift arm 134 at a point spaced approximately one third of the effective length of each lift arm from their fixed ends. The fulcrums 204, which may be formed either in one piece with the beam 202' or may be separate parts suitably secured thereto, are intended to prevent the lift arms 134 from hitting the disks 112 under the influence of external forces.

Figure 9:
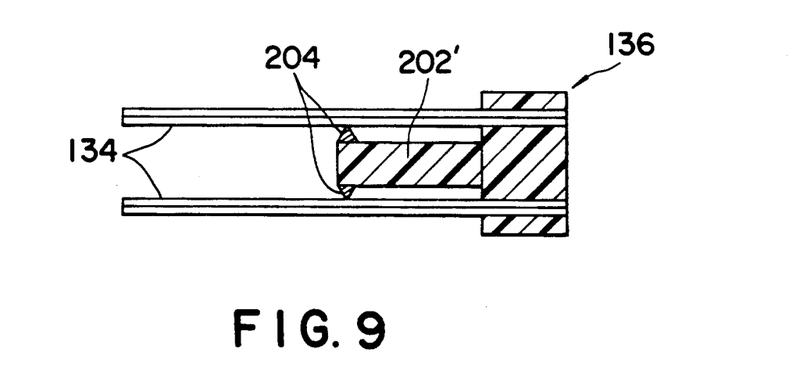
FIG. 9 is a partial vertical sectional view showing a slight modification of the transducer lifter mechanism of FIG. 7.

The extended beams 202' with the fulcrums 204 thereon may not necessarily be integral parts of the support structure 136 but may be separate parts suitably secured to the support structure as shown in FIG. 9.

FIGS. 7 and 8 show positive electrode terminals 208 and negative electrode terminals 210 projecting from the support structure 136 in a direction away from the disks 112. These terminals are to be connected to the bimorph driver circuit such as shown at 40 in FIG. 1, via leads 212 and a connector 214.

It will also be noted from FIG. 7 that the support structure 136 is designed for the ease of mounting the transducer lift arms 134 in position between the disks 112 and transducer carrier beams 122, just as the post 36 of the first disclosed transducer lifter mechanism 32 is The support structure 136 is rotatable about a fixed pivot pin 148 erected on a frame member such as shown at 44 in FIGS. 3 and 4, and is secured to this frame member in a required angular position by a single screw 142 or like fastener element. The method of mounting this lifter mechanism 132 in position on the data storage apparatus 110 is considered self evident from the foregoing description of the lifter mechanism 32.

In operation, FIG. 8 is explanatory of how the improved support structure 136 functions to prevent the transducer lift arms 134 from hitting the magnetic disks 112 when an external upward force is applied to the data storage apparatus 110. The resulting upward bending of the upper one of each pair of lift arms 134 may be limited as required by suitable flexible linings, not shown, on the arms. The lower one of each pair of lift arms 134, on the other hand, is effectively restrained by the associated fulcrum 204 from bending up to such an extent as to strike the disk 112. The same description substantially applies when an external force is applied downwardly to the data storage apparatus 110.

Also, held against the midpoint of the transducer lift arms 134, the fulcrums 204 function to prevent too much bending of the lift arms by resonant vibration. As far as resonant vibration is concerned, the fulcrums 204 may be considered to substantially divide each lift arm 134 into two parts, one between the fixed end and the fulcrum and the other between the fulcrum and the free end. Assume that the resonant frequency of each lift arm 134 is 290 hertz if not provided with the fulcrum 204. The fulcrum 204 divides this same lift arm into the two parts of different resonant frequencies, 14.1 kilohertz and 750 hertz. It is therefore apparent that the fulcrums 204 can effectively prevent excessive resonant vibrations of the lift arms 134 without in any way interfering with their desired bending by the piezoelectric effect.

It is, of course, understood that the fundamental concepts of the present invention are applicable to various other types of rotating disk data storage apparatus including those having three or more data storage disks. Moreover, various changes may be made in the details of the apparatus disclosed above in order to conform to design preferences or to the requirements of each specific application of the invention, without departing from the scope of the following claims.

What is claimed is:

1. In a rotating disk data storage apparatus including at least one data storage disk driven by a disk drive motor for rotation about a predetermined axis, at least one data transducer capable of riding in close proximity to a major surface of the disk by virtue of an air bearing created by rotation of the disk for writing and reading data on the major surface thereof, and transducer carriage means for moving the transducer across a multiplicity of concentric data tracks on the major surface of the disk, the transducer carriage means including a transducer carrier beam of resilient material carrying the transducer on one end thereof, the transducer being held in contact with a predefined landing zone on the major surface of the disk under the bias of the transducer carrier beam when the disk is out of rotation, a device for lessening the load force exerted by the transducer on the disk at least during the starting period of the disk drive motor, comprising:
   (a) a transducer lift arm of piezoelectric material disposed between the data storage disk and the transducer carrier beam and normally held out of contact with both of them; and
   (b) a lift arm driver means connected to the transducer lift arm for applying a prescribed voltage thereto at least during the starting period and hence for causing the transducer lift arm to lift the carrier beam away from the disk to such an extent as to lessen the load force exerted by the transducer on the disk.

2. The invention of claim 1 wherein the transducer lift arm is of bimorph cell construction comprising two strips of piezoelectric material cemented together so that the arm bends in proportion to an applied voltage.

3. The invention of claim 1 further comprising support means for supporting the transducer lift arm so as to facilitate its mounting in place between the data storage disk and the transducer carrier beam, the support means comprising:
   (a) frame means;
   (b) a pivot mounted to the frame means in the vicinity of the periphery of the data storage disk and extending parallel to the axis of rotation of the disk;
   (c) a support structure having the transducer lift arm cantilevered thereto and mounted to the frame means for rotation about the pivot; and
   (d) fastener means for securing the support structure to the frame means in a required angular position of the transducer lift arm with respect to the transducer carrier beam and the data storage disk.

4. The invention of claim 3 wherein the pivot is a bolt received in a clearance hole in the support structure.

5. The invention of claim 1 wherein the transducer lift arm has a pointed end for point contact with the transducer carrier beam.

6. The invention of claim 1 wherein the disk drive motor is a sensorless, brushless motor having a rotor driven by stator coils; further comprising:
   (a) a motor driver circuit for exciting the stator coils of the motor;
   (b) frequency generator means for generating a motor speed signal representative of the speed of rotation of the motor;
   (c) pulse generator means for generating a motor position signal representative of the angular position of the rotor of the motor;
   (d) a motor starter circuit connected between the frequency generator means and the motor driver circuit for causing the same to drive the motor during a starting period; and
   (e) a constant speed, constant phase control circuit connected to the motor driver circuit for causing the same to drive motor at a predetermined normal speed after the starting period;
   (f) the motor starter circuit being also connected to the lift arm driver means for causing the same to apply the prescribed voltage to the transducer lift arm during the starting period of the disk drive motor.

7. The invention of claim 1 further comprising:
   (a) support means for rigidly supporting one end of the transducer lift arm, another end portion of the transducer lift arm being disposed between the data storage disk and the transducer carrier beam; and
   (b) a fulcrum held against the transducer lift arm at a point intermediate the opposite ends thereof in order to reduce the bending of the transducer lift arm in response to external forces or vibrations.

* * * * *